United States Patent
Zhang

(10) Patent No.: US 9,571,522 B2
(45) Date of Patent: Feb. 14, 2017

(54) METHOD FOR APPLYING LOCATION-BASED CONTROL POLICY OF MOBILE DEVICE

(75) Inventor: Bo Zhang, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 13/220,136

(22) Filed: Aug. 29, 2011

(65) Prior Publication Data

US 2013/0052990 A1 Feb. 28, 2013

(51) Int. Cl.
*H04M 1/66* (2006.01)
*H04L 29/06* (2006.01)
*H04L 29/08* (2006.01)
*H04W 4/02* (2009.01)
*H04W 12/08* (2009.01)

(52) U.S. Cl.
CPC ............ *H04L 63/20* (2013.01); *H04L 67/30* (2013.01); *H04W 4/025* (2013.01); *H04W 12/08* (2013.01); *H04L 63/107* (2013.01); *H04L 63/108* (2013.01)

(58) Field of Classification Search
CPC .......... H04W 4/02; H04W 4/04; H04W 64/00; H04W 4/06; H04W 4/08
See application file for complete search history.

(56) References Cited

U.S. PATENT DOCUMENTS

| | | | |
|---|---|---|---|
| 8,751,613 B1* | 6/2014 | Medved | H04L 45/00 370/229 |
| 2001/0048364 A1* | 12/2001 | Kalthoff et al. | 340/573.1 |
| 2008/0285542 A1* | 11/2008 | Jachner | 370/351 |
| 2009/0061863 A1* | 3/2009 | Huggett et al. | 455/434 |
| 2011/0196977 A1* | 8/2011 | Lynch et al. | 709/229 |
| 2012/0282945 A1* | 11/2012 | Guha | H04W 4/023 455/456.1 |
| 2012/0303827 A1* | 11/2012 | Neystadt | H04L 63/107 709/229 |

* cited by examiner

*Primary Examiner* — Shantell L Heiber
(74) *Attorney, Agent, or Firm* — Jefferson IP Law, LLP

(57) ABSTRACT

A method for applying a control policy of a mobile device is provided. The method includes determining whether a current location of the mobile device satisfies predetermined location parameters of the control policy, and, if it is determined that the current location of the mobile device satisfies the predetermined location parameters of the control policy, applying the control policy.

21 Claims, 6 Drawing Sheets

METHOD FOR APPLYING LOCATION-BASED CONTROL POLICY OF MOBILE DEVICE

BACKGROUND OF THE INVENTION

1. Field of the Invention

The present invention relates to a method for controlling network access of mobile devices. More particularly, the present invention relates to a method for providing a location-based control policy of a mobile device.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

FIG. 1 is a smartphone according to the related art. FIG. 2 is a tablet computer according to the related art. Mobile devices such as tablet computers and smartphones that include internet browsers as standard applications have become common enough that it is no longer unusual for a child to have such a device. Given the wide availability of $3^{rd}$ Generation (3G) and Wireless Fidelity (WiFi) wireless network services, children may now use tablet computers and smartphones to access the internet from almost any location.

In the related art, there have been various software packages that could be installed on computers to monitor or control access to the internet generally, or to specific sites on the internet. For example, many parents install filters to prevent a computer from displaying pornography, drug use, violence, or other disturbing material. Such filters sometimes have options to apply different filters according to the user and time of day, or to specifically ban or allow access to particular web sites. At least one such filtering software package, NETNANNY MOBILE™, is available for parents to install on children's smartphones using the BLACKBERRY™, ANDROID™, SYMBIAN™, or WINDOWS MOBILE™ operating systems.

However, before now there has been no option to implement a control policy which takes into account a desire to configure the policy according to the user's location.

Accordingly, there is a need for an apparatus and method for providing a location-based control policy and validation for mobile devices.

SUMMARY OF THE INVENTION

Aspects of the present invention are to address at least the above-mentioned problems and/or disadvantages and to provide at least the advantages described below. Accordingly, an aspect of the present invention is to provide an apparatus and method for providing a location-based control policy and validation for mobile devices.

In accordance with an aspect of the present invention, a method for applying a location-based control policy of a mobile device is provided. The method includes determining whether a location of the mobile device satisfies predetermined location parameters of the control policy, and, if it is determined that the current location of the mobile device satisfies the predetermined location parameters of the control policy, applying the control policy.

In accordance with another aspect of the present invention, a method for applying a control policy of a mobile device is provided. The method includes determining a current absolute location of the mobile device, determining a current absolute location of a predetermined server device indicated in the control policy, calculating a distance between the current absolute location of the mobile device and the current absolute location of the predetermined server device, determining whether the distance is within a predetermined range indicated in the control policy, and, if it is determined that the distance is within the predetermined range, applying the control policy.

In accordance with yet another aspect of the present invention, a method for applying a control policy of a mobile device is provided. The method includes discovering all devices comprising a limited range wireless communication address within range of the mobile device, for each discovered device, determining whether the address is indicated in a control policy of the mobile device, and if it is determined that the address is indicated in the control policy, applying the control policy.

In accordance with still another aspect of the present invention, a method for applying a location-based control policy of a mobile device is provided. The method includes determining a current absolute location of the mobile device, calculating a distance between the current absolute location and a predetermined absolute location indicated in the control policy, determining whether the distance is within a predetermined range indicated in the control policy, and, if it is determined that the distance is within the predetermined range, applying the control policy.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for providing a location-based control policy and validation for mobile devices.

Figure 1:
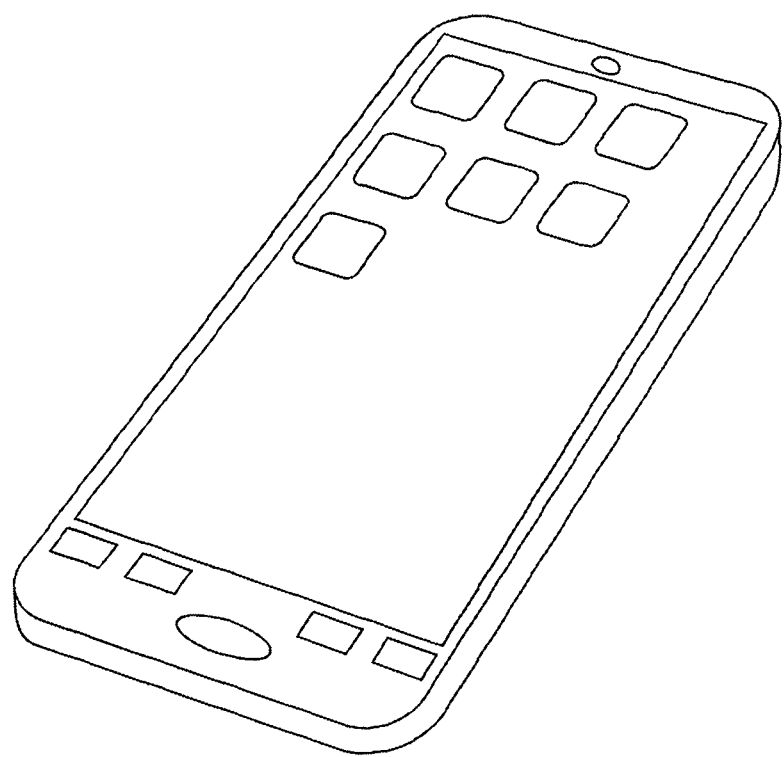
FIG. 1 is a smartphone according to the related art.
Figure 2:
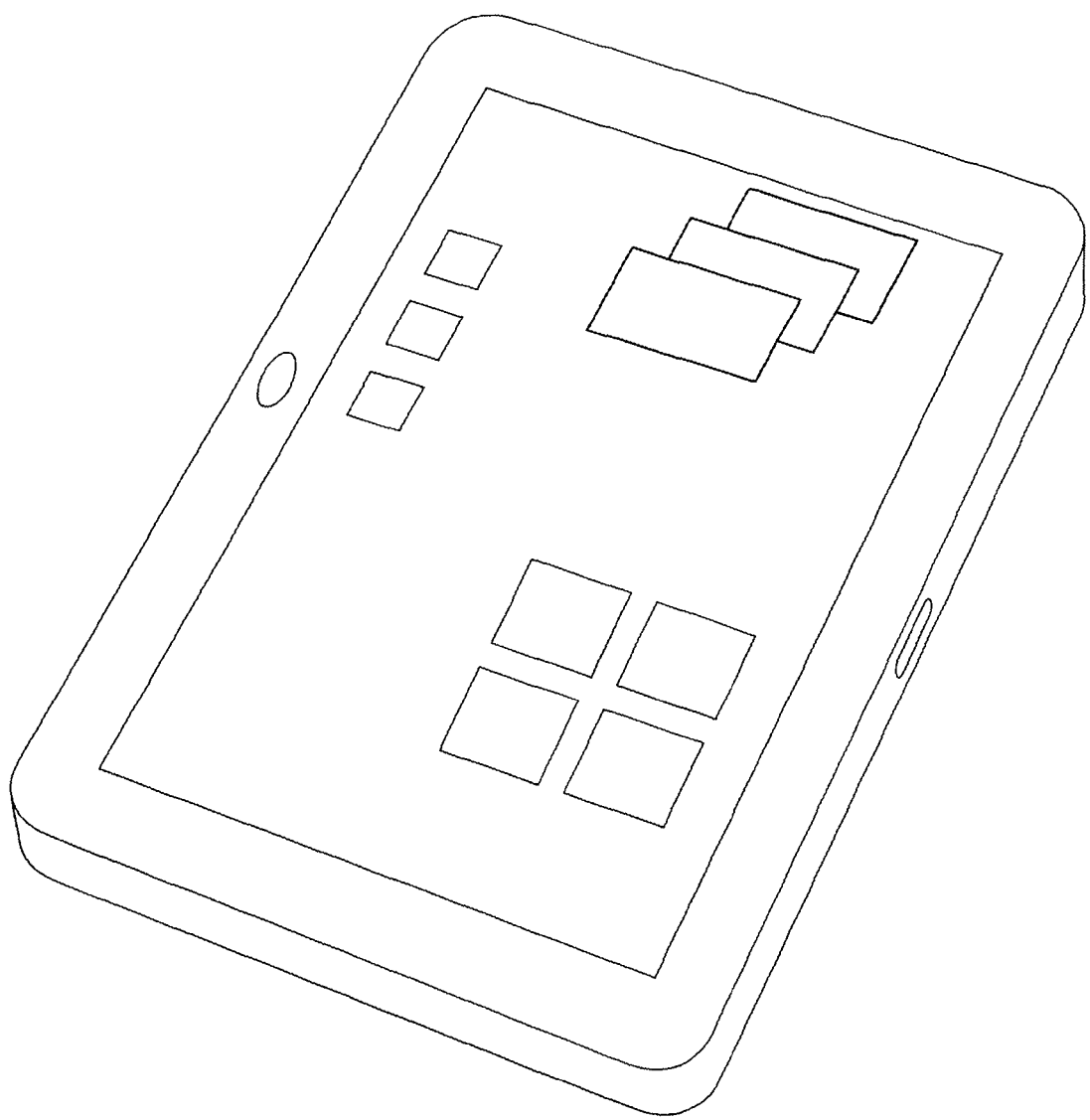
FIG. 2 is a tablet computer according to the related art.
Figure 3:
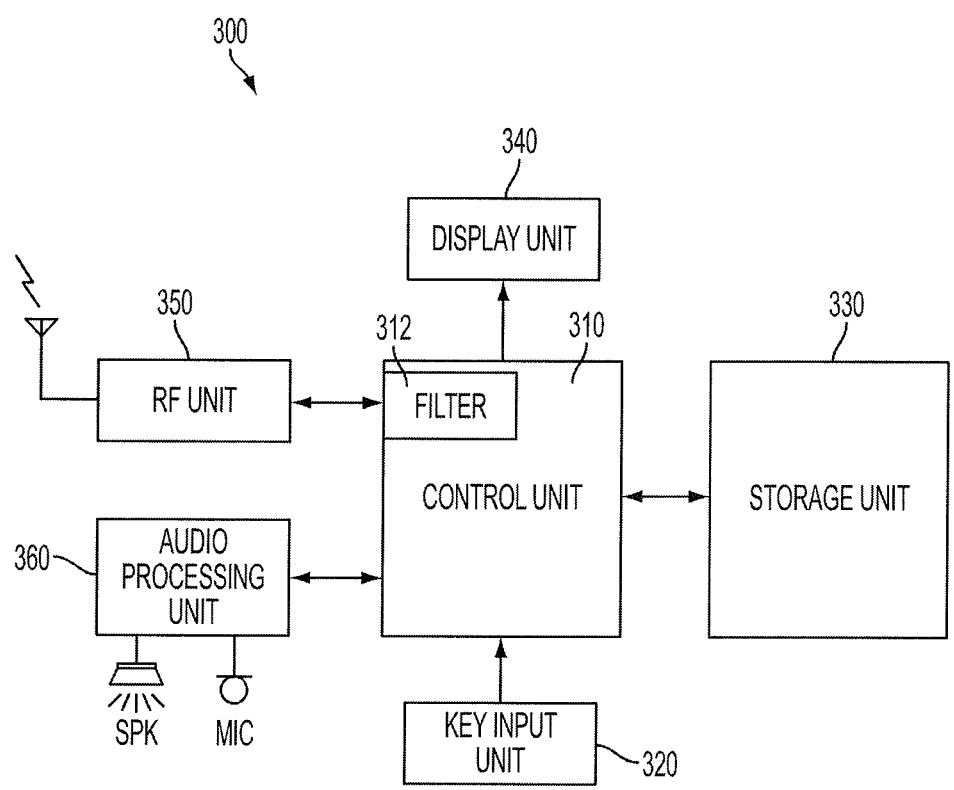
FIG. 3 is a functional block diagram of a mobile terminal according to an exemplary embodiment of the present invention.

FIG. 3 is a functional block diagram of a mobile terminal according to an exemplary embodiment of the present invention.

Referring to FIG. 3, a mobile terminal 300 includes a control unit 310 for processing and controlling functions of the mobile terminal 300, a key input unit 320, a storage unit 330, a display unit 340, a Radio Frequency (RF) unit 350, and an audio processing unit 360 including a microphone MIC and a speaker SPK.

In some embodiments, various functions may be combined into a single unit. For example, the key input unit 320 and the display unit 340 may be combined as a touchscreen without departing from the scope of the invention.

The control unit 310 includes a filter 312. When a user attempts to access the interne, the filter 312 compares the user's desired destination with an access policy. If it is determined that the policy does not forbid access to the interne in a present state, then the interne site is accessed normally. If it is determined that a policy forbids access to the interne site in the present state, then no contact message is sent to the desired site, and the user sees a message indicating that the policy does not allow the desired access in the present state.

Similarly, the filter may also filter incoming information from the RF unit.

The criteria of the present state are stored in the memory storage unit 330 and may include such factors as a time of day, a day of the week, whether a particular desired site is specifically listed as an allowed site or a forbidden site, and whether a particular desired site includes content that is specifically allowed or forbidden. For example, a policy might forbid any web browsing after 9:30 p.m. the night before a child has school, ban social networking sites during school hours Monday-Friday, ban all sites with depictions of graphic violence, and allow access to sites with first aid information at all times. A policy might also forbid incoming text messages and chat from 11:00 p.m.-7:00 a.m.

In an exemplary embodiment of the present invention, the present state information further includes a location of the mobile terminal.

A parent or guardian will determine the policy rules for the child's mobile terminal. In an exemplary embodiment the control policy filter is implemented through software, and may be included with the mobile terminal or may be purchased and installed by the parent or guardian.

In an exemplary embodiment, the parent or guardian will set a password to control access to the policy rules. However, the present invention is not limited thereto.

For example, the parent or guardian may also set his own mobile terminal to be a remote manager of the child's mobile terminal. In this example, a child may contact his parents at work to request an exception or change of policy, and they can implement the change immediately if they choose. Remote management may be either by directly accessing the child's mobile terminal or through a server. Remote access may be controlled by password as above, by a designated master control terminal, or a combination thereof. If remote management is limited by password only, then the parent may control the child's mobile terminal from any interne connection.

In an exemplary embodiment of the present invention, the child's mobile terminal may send a policy authorization request including its current absolute location to an intermediate server. The policy authorization request may include information of a destination address and of a type of connection for the network site the child's mobile terminal is attempting to access. The intermediate server then sends a query to the parent's mobile terminal. The parent's mobile terminal then queries its own current absolute location, and replies to the intermediate server with information of its own absolute location. The intermediate server then calculates the distance between the mobile terminals, and sends a message including information of the calculated distance to the child's mobile terminal. In this exemplary embodiment, if there are multiple parent mobile terminals in the control policies, the policy authorization request may include information of all the parent mobile terminals, and the intermediate server calculates the distance to each and sends all the calculated distance information to the child's mobile terminal.

In yet another exemplary embodiment, information of each parent's mobile terminal's location is sent to the child's mobile terminal, and the child's mobile terminal calculates the respective distances to the parents' mobile terminals.

In still another exemplary embodiment, the child's mobile terminal sends an authorization request including information of its own current absolute location to the parent's mobile terminal. The authorization request may be sent to the parent's mobile terminal directly or through an intermediate server. The parent's mobile terminal may be configured reply to the authorization request automatically, and alternatively may be configured to prompt a user input. If the user input is prompted, the prompt may include information included in the authorization request. If the user input is prompted, the user may configure the reply to include an 'allow' parameter (current time, any distance) or a 'disallow' parameter.

In yet still another exemplary embodiment of the present invention, an authorization reply from the parent's mobile terminal may include an expiration value. If the expiration value is included, then the child's mobile terminal resets a counter and stores the expiration value. On subsequent network access attempts, if the counter has not reached the expiration value, then the child's terminal applies the same access policy again and increments the counter. The expiration value may be, for example, a number of the policy may be applied without renewing the authorization, such as, "allow N times," where N is an integer. Alternatively, the expiration value may be a period of time during which the policy may be applied without renewing the authorization, such as, "allow for 10 minutes." A default expiration value may be "allow 1 times." The parent's mobile terminal may prompt a user input to determine the expiration value.

In an exemplary embodiment of the present invention, the policies are stored on the child's mobile terminal. The child's mobile terminal may be configured such that a user must enter a password on the child's mobile terminal to manage the control policies. Alternatively, the child's mobile terminal may be configured such that a user may manage the control policies remotely over the network. If the control policies may be managed remotely, the child's mobile terminal may be configured such that only specific devices (i.e., the parents' mobile terminals) may manage the control policies, or may be configured such that the parents may remotely manage the control policies from any network connection by entering the password, or may be configured such that remote management is authorized only from the specific devices and also requires entry of the password. The specific devices may be identified by phone number, WiFi address, BLUETOOTH address, Near Field Communication target identification, or device name.

In an exemplary embodiment of the present invention, the control policies may be maintained on a separate server. The parents may then manage the policies on the server, and the server then downloads the updated policies to the child's mobile terminal. In this exemplary embodiment, the parents may access the server from any network device by using a password, from specific devices (i.e., the parents' mobile terminals), of by a combination of these. The specific devices may be identified by phone number, WiFi address, BLUETOOTH address, or device name.

A policy as used in exemplary embodiments of the present invention includes an internet domain name and an associated action. The internet domain name identifies an organization or other entity on the internet. The action defines the permitted or banned action on the domain. For example, a policy might include, "facebook.com: Not Allowed." This example restricts any operation on facebook.com.

A policy as used in exemplary embodiments of the present invention is associated with a location name. The location name will be selected by the parent when the policy is created. For example, a policy may be named "Home."

A policy as used in exemplary embodiments of the present invention is associated with a timeline. The timeline defines a range of time in which the policy is valid and applied. For example, a timeline may be entered as "Any Time," "Sunday, Saturday," or "9:00 a.m.-3:00 p.m. AND Monday-Friday." A policy may also have an expiration date, for example, "UNTIL 5:00 p.m. Dec. 26, 2011."

In an exemplary embodiment of the present invention, the location is an absolute location. In this embodiment, the mobile terminal includes Global Positioning System (GPS) or similar means to definitively establish the user's location.

An absolute location may be any location which is determinate. An absolute location may be, for example, a set of geographic coordinates (i.e., latitude and longitude), a street address, a street, a postal ZIP code, or a geopolitical boundary (i.e., within the border of a particular city limit, county, state, nation, etc.).

In an exemplary embodiment, the policy will be applied if the user is within a predetermined distance of a predetermined absolute location. Multiple locations may be designated, such that the policy is applied if the user is within the corresponding predetermined distance of any of them.

In an exemplary embodiment, the policies are ordered according to priority. If there is a conflict between policies, the highest priority policy will govern. For example, if web browsing is enabled if the location is an interstate highway but restricted if the child travels out of state, then a conflict may arise if the child is on a school field trip. Assume for this example that the state border policy is higher priority than the interstate highway policy; in such a conflict, the higher priority state border policy would govern, and the web browsing would be restricted. The policy priorities may be managed by the parent locally or remotely, as described above.

In an exemplary embodiment, actions within a named policy are also ordered according to priority. Conflicts between actions in a named policy are resolved in a similar manner to that described above. The action priorities may be managed by the parent locally or remotely, as described above.

Figure 4:
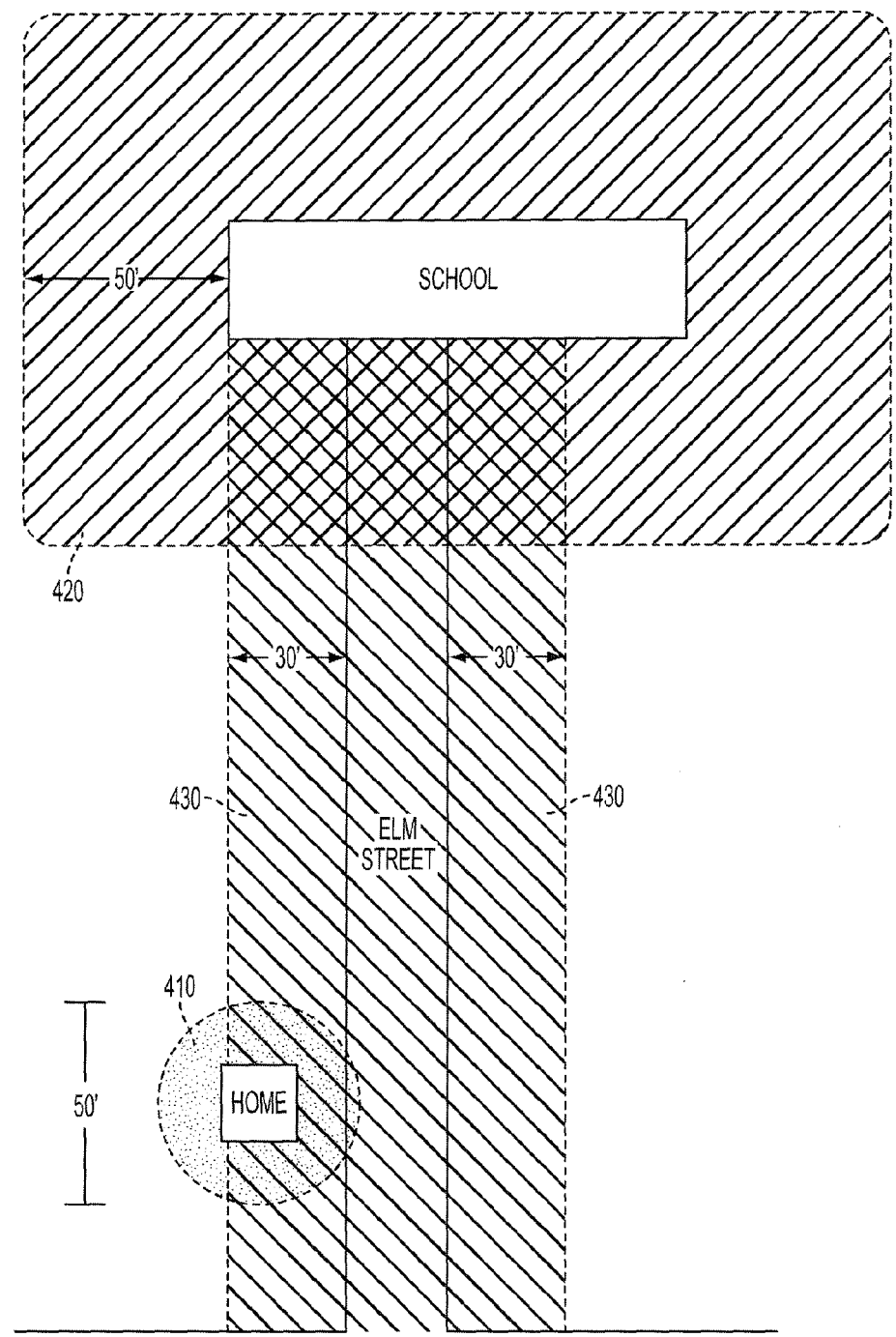
FIG. 4 illustrates a neighborhood with different policies applied in various locations according to an exemplary embodiment of the present invention.

FIG. 4 illustrates a neighborhood with different policies applied in various locations according to an exemplary embodiment of the present invention.

Referring to FIG. 4, a first policy applies if the child is within a fifty foot wide zone 410 centered on the family home. A second policy applies if the child is within a zone 420 extending fifty feet around the child's school. A third policy applies if the child is within a zone 430 extending thirty feet from either side of the street, as in a situation where the child is playing outside or visiting friends who live on the same street.

In this example, zones 410 and 430 overlap and therefore may conflict. If the home policy has the highest priority, then the home policy is applied when the child is in zone 410 regardless of other policies. Similarly, zones 420 and 430 overlap and therefore may conflict. If the zone 420 has a higher priority than zone 430, then the school policy for zone 420 would be applied as soon as the child is within fifty feet of the school.

As discussed above, the location-based policies may be used in conjunction with other criteria. In the above example, the parent may determine that the school policy for zone 420 applies only on weekdays between 9:00 a.m. and 3:00 p.m., for example.

Figure 5:
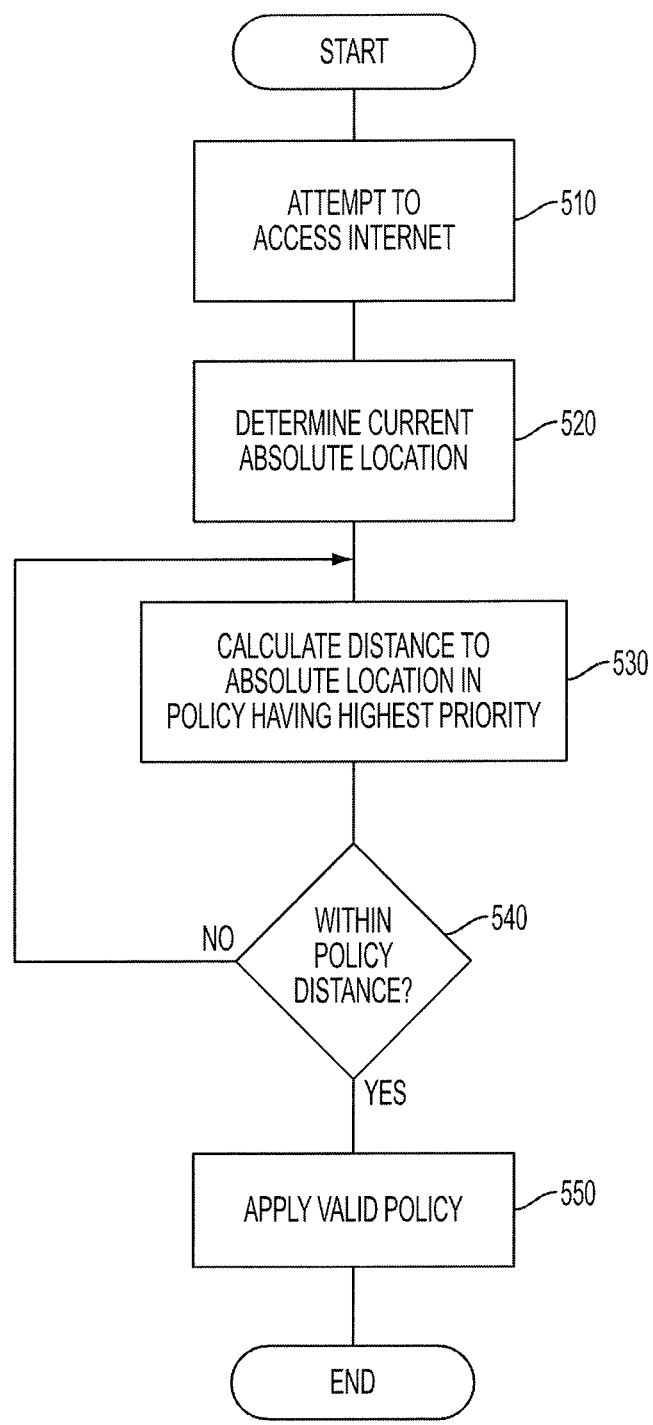
FIG. 5 is a flowchart of validating a policy according to an exemplary embodiment of the present invention.

FIG. 5 is a flowchart of validating a policy according to an exemplary embodiment of the present invention.

Referring to FIG. 5, the child attempts to access the interne from his mobile device at step 510. Then the mobile device determines its current absolute location at step 520. The mobile terminal then calculates a distance between the current absolute location and the absolute location defined in a highest priority remaining policy at step 530. If the distance is determined at step 540 to be within the associated range specified in the policy, then the policy is determined to be valid and is applied at step 550. The process then ends.

If the policy is determined at step 540 to not be valid and is therefore not applied, the process returns to step 530 to determine whether a next highest priority policy applies.

If no named policy is found to apply, then a lowest priority "Default" policy will eventually be reached at step 530. The Default policy will have a location of "Any" and may, for example, be set to "Not Allowed." Therefore, if no higher priority policy is validated and applied, the Default policy will be applied at step 550.

Although not shown in FIG. 5, other policy criteria must also match for the policy to be validated and applied. For example, each policy has a timeline which is compared with a current time; if the current time is determined to be outside the timeline of the policy, then the policy is not validated and not applied. The Default policy timeline is "Any Time".

In an exemplary embodiment of the present invention, the location is a relative location. In this embodiment, the mobile terminal detects whether another device is within a predetermined distance.

The relative location may be by occurrence. For example, when the child's mobile terminal detects a Wireless Fidelity (WiFi)™ signal from a home router's Media Access Control (MAC) address that is listed in a policy "AtHome", the policy is applied without any determination of distance. Alternatively, the detected signal may be a BLUETOOTH signal from a parent's mobile terminal, and the policy "WithMom" is applied. In this embodiment, it is presumed that the signal has a limited range, such that detecting the signal is sufficient to conclude that the child is within a predetermined distance of the other device. Alternately, the detected signal may be a Near Field Communication (NFC) target identification.

To determine whether a policy is valid by occurrence, the child's mobile terminal first discovers all close range devices by any appropriate means. The mobile terminal then compares the addresses of the discovered devices with those specified in its policies. If a device with a specified address is discovered, a match occurs. Validation by occurrence is used only for protocols that are known to be of limited range.

Alternatively, the relative location may be by distance. For example, the policy "WithDad" may be applied when the child is within fifty feet of the parent's mobile terminal. In this example, both the child's mobile terminal and the parent's mobile terminal must include GPS or similar means to definitively establish the user's location.

Of course, multiple rules could apply a same policy. For example, the same policy "WithDad" may be applied when the child is within fifty feet of the parent's mobile terminal or when the parent's mobile terminal BLUETOOTH signal is detected (or both).

Similarly, a policy may include multiple absolute or relative locations. These location restrictions can be combined using logical operators such as 'and', 'or', 'not', etc. For example, a policy could include, "Location: Home AND (WithDad OR WithMom)".

In an exemplary embodiment, the parent's mobile terminal may be identified by its telephone number, but the present invention is not limited thereto. For example, the parent's location may alternatively be determined according to a location tracking service such as FOURSQUARE. Other means of determining the parent's location are of course possible without departing from the scope or spirit of the present invention.

In an exemplary embodiment, the parents may manage the control policies with any identifiable device. For example, a policy including "Location: WithAuntLisa" may be entered if a device address (i.e., phone number, WiFi address, BLUETOOTH address) for an additional device is known. The policy may be set to be temporary by including an expiration, as described earlier. The policy may be set such that the additional device either does or does not have management privileges to manage the control policies for the child's mobile terminal. Preferably, the additional device will have validation software installed in order to reply to queries and authorization requests.

Figure 6:
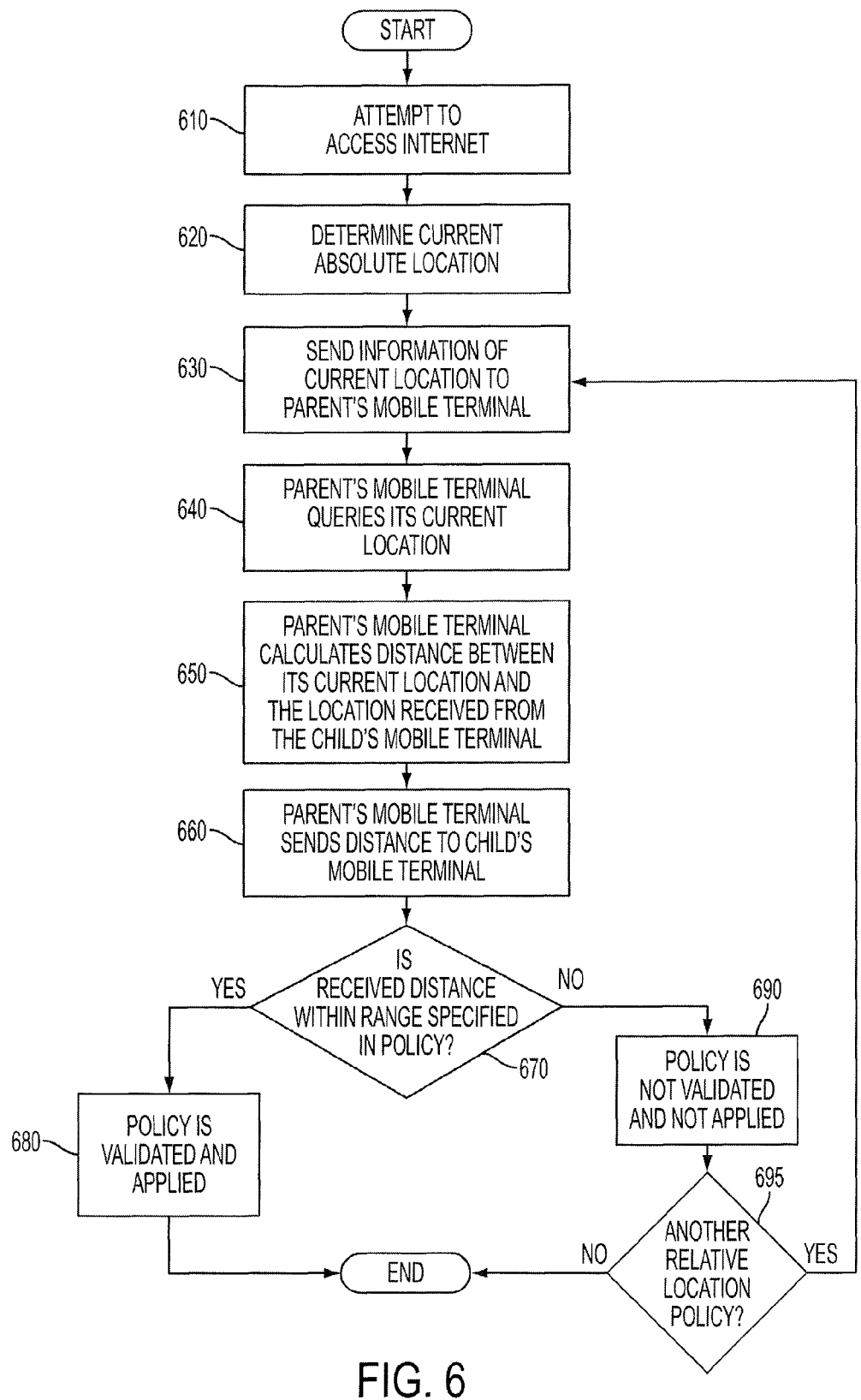
FIG. 6 is a flowchart of validating a policy according to an exemplary embodiment of the present invention.

FIG. 6 is a flowchart of validating a policy according to an exemplary embodiment of the present invention.

Referring to FIG. 6, a child's mobile terminal attempts to access the internet at step 610. The mobile terminal then determines its own absolute location at step 620. These steps are identical to steps 510 and 520 described above.

The mobile terminal then sends information of its own location to the parent's mobile terminal at step 630. If more than one parent's mobile terminal has a corresponding relative location policy in the mobile terminal, then the mobile terminal will consult the parents' mobile terminals in priority order, starting with a highest priority.

At step 640, the parent's mobile terminal will query its own absolute location in response to the received message from the child's mobile terminal. The parent's mobile terminal must have GPS or comparable means of determining its own absolute location.

The parent's mobile terminal calculates a distance between its own current location and the received location of the child's mobile terminal at step 650. The parent's mobile terminal then sends a message including information of this distance to the child's mobile terminal at step 660.

At step 670, the child's mobile terminal compares the distance information received from the parent's mobile terminal with a range specified in the policy for that parent's mobile terminal. If the distance is determined to be within the specified range, then the policy is validated and applied at step 680. The process then ends.

At step 690, if the distance is determined to not be within the specified range, then the policy is not validated and not applied. The child's mobile terminal then determines at step 695 whether there is another lower priority policy to check. If there is no remaining policy to check, the process ends. If there is another relative location policy to check, then the process returns to step 630.

In an exemplary embodiment of the present invention, multiple types of location based policies are employed on a same child's mobile terminal. The policies would be applied in priority order as described above; that is, all policies of all types would be arranged in priority order together.

In this exemplary embodiment, each policy includes an indication of whether it is based on an absolute location or an identification of a device as the location. If the policy is based on an identified device, then the policy is validated according to whether the type of identified device is an occurrence type, such as WiFi or BLUETOOTH, or a relative location type, such as a telephone number.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for applying a location-based control policy of a mobile device, the method comprising:
   determining whether a current location of the mobile device satisfies predetermined location parameters of the control policy;
   determining a present time; and
   if it is determined that the current location of the mobile device satisfies the predetermined location parameters of the control policy and if it is determined that the present time is within a timeline indicated in the control policy, applying the control policy, wherein the timeline defines a range of time in which the control policy is valid and applied, wherein the control policy determines whether to allow or disallow access to at least one of a network, a specific site on the network, a type of communication via the network, or content accessed via the network, according to the location parameters, wherein the control policy can be configured as an absolute location based policy, a relative location based control policy, or an occurrence based control policy, wherein the absolute location based policy is applied if the mobile device is determined to be at a predetermined absolute location specified in the absolute location based policy, and wherein the relative location based control policy is applied if a distance between the mobile device and a predetermined device is less than a predetermined threshold distance, the predetermined device and the predetermined threshold distance being specified in the relative location based control policy.

2. The method of claim 1, wherein the mobile device comprises a plurality of control policies, and each of the plurality of control policies comprises one or more of the absolute location based control policy, the relative location based control policy, or the occurrence based control policy.

3. The method of claim 2, wherein the plurality of control policies are ordered according to a priority order, and if any two of the control polices would conflict when applied, then a control policy of the two control policies comprising a higher priority is applied and a control policy of the two control policies comprising a lower priority is not applied.

4. The method of claim 2, wherein predetermined location parameters of the absolute location based control policy comprise an absolute location and a distance, predetermined location parameters of the relative location based control policy comprise an address of the device specified in the relative location based control policy and the threshold distance, and predetermined location parameters of the occurrence based control policy comprise a device address.

5. The method of claim 1, wherein the control policy comprises an expiration value, wherein the mobile device first determines whether a counter indicating whether the control policy has been previously applied has reached the expiration value, and if it is determined that the counter has not reached the expiration value, applies the control policy and increments the counter, and wherein if it is determined that the counter has reached the expiration value and if it is determined that the current location of the mobile device satisfies the predetermined location parameters of the control policy and the control policy is applied, the counter is reset.

6. The method of claim 5, wherein the expiration value comprises a number of times the control policy may be applied without re-determining whether the current location of mobile device satisfies the predetermined location parameters.

7. The method of claim 5, wherein the expiration value comprises a duration of a time period during which the control policy may be applied without re-determining whether the current location of the mobile device satisfies the predetermined location parameters.

8. The method of claim 5, further comprising:

if the predetermined location parameters comprise a device address, then the mobile device sends a policy authorization request comprising a current absolute location of the mobile device to a server device comprising the device address; and the server device sends a response comprising the expiration value to the mobile device, wherein the expiration value is determined according to a user input of the server device.

9. The method of claim 5, further comprising:

if the predetermined location parameters comprise a device address, then the mobile device sends a policy authorization request comprising a current absolute location of the mobile device to a server device comprising the device address; and the server device sends a response comprising a location parameter to the mobile device, wherein the location parameter in the response is determined according to a user input of the server device.

10. A method for applying a control policy of a mobile device, the method comprising:

determining a current absolute location of the mobile device;

determining a current absolute location of a predetermined server device specified in the control policy;

calculating a distance between the current absolute location of the mobile device and the current absolute location of the predetermined server device;

determining whether the distance is within a predetermined threshold range indicated in the control policy;

determining a present time; and if it is determined that the distance is within the predetermined threshold range and if it is determined that the present time is within a timeline indicated in the control policy, applying the control policy, wherein the timeline defines a range of time in which the control policy is valid and applied, and wherein the control policy determines whether to allow or disallow access to at least one of a network, a specific site on the network, a type of communication via the network, or content accessed via the network, according to the predetermined server device.

11. The method of claim 10, wherein the mobile device comprises a plurality of control policies.

12. The method of claim 11, wherein the determining of the current absolute location of the predetermined server device comprises:

the mobile device sending information of its current absolute location to the server device; and the server device querying its own current absolute location.

13. The method of claim 12, wherein the server device calculates the distance and sends information of the calculated distance to the mobile device.

14. The method of claim 11, wherein the plurality of control policies are ordered according to a priority order, and if any two of the control polices would conflict when applied, then a control policy of the two control policies comprising a higher priority is applied and a control policy of the two control policies comprising a lower priority is not applied.

15. The method of claim 11, wherein the absolute location of the mobile device and the absolute location of the server device are determined by Global Positioning System (GPS).

16. The method of claim 10, wherein the determining of the current absolute location of the predetermined server device comprises:
   the mobile device sending information of its current absolute location to a second server device and the second server device relaying the information to the server device;
   the server device querying its own current absolute location;
   the server device sending information of its own current absolute location to the second server device;
   the second server device calculating the distance; and
   the second server device sending information of the calculated distance to the mobile device.

17. A method for applying a control policy of a mobile device, the method comprising:
   determining a current absolute location of the mobile device;
   calculating a distance between the current absolute location and at least one predetermined absolute location specified in the control policy;
   determining whether the distance is within a predetermined threshold range indicated in the control policy;
   determining a present time; and
   if it is determined that the distance is within the predetermined threshold range and if it is determined that the present time is within a timeline indicated in the control policy, applying the control policy,
   wherein the timeline defines a range of time in which the control policy is valid and applied, and
   wherein the control policy determines whether to allow or disallow access to at least one of a network, a specific site on the network, a type of communication via the network, or content accessed via the network, according to the predetermined absolute location.

18. The method of claim 17, wherein the mobile device comprises a plurality of control policies.

19. The method of claim 18, wherein
   the plurality of control policies are ordered according to a priority order, and
   if any two of the control polices would conflict when applied, then a control policy of the two control policies comprising a higher priority is applied and a control policy of the two control policies comprising a lower priority is not applied.

20. The method of claim 17, wherein the absolute location of the mobile device is determined by Global Positioning System (GPS).

21. The method of claim 17, wherein the at least one predetermined absolute location specified in the control policy is indicated by at least one of geographic coordinates specifying a latitude and longitude, a street address, a street, a ZIP code, a city limit, a county line, a state border, or a national border.

* * * * *